3,507,778
CRACKING PETROLEUM FRACTIONS WITH A CRYSTALLINE ZEOLITE CATALYST IN COMBINATION WITH A PHOSPHATE PROMOTED SILICA-MAGNESIA CATALYST
Elroy M. Gladrow and Warren M. Smith, Baton Rouge, La., assignors to Esso Research and Engineering Company, a corporation of Delaware
No Drawing. Filed Sept. 5, 1967, Ser. No. 665,949
Int. Cl. B01j *11/40;* C10g *11/02, 13/10*
U.S. Cl. 208—111                           10 Claims

ABSTRACT OF THE DISCLOSURE

Petroleum feedstocks are cracked or hydrocracked to produce a maximum amount of gasoline in the presence of a crystalline zeolite catalyst in combination with a phosphate promoted silica-magnesia catalyst.

---

This invention relates to a process for cracking petroleum fractions. More particularly the invention relates to cracking or hydrocracking petroleum fractions boiling above the gasoline boiling range to produce fractions boiling in the gasoline range in the presence of a combination of catalysts.

Silica-magnesia gel type conversion catalysts are well known in the art. These catalysts are capable of producing more $C_5/430°$ F. naphtha and less gas in catalytic cracking of conventional feeds than the amorphous silica-alumina gel catalysts. However, the prior art silica magnesia catalysts are characterized by a rather tight pore structure. After the catalyst has been in use for a considerable period of time with repeated regenerations, it gradually becomes more difficult to burn off the coke at conventional regeneration conditions. Thus, coke on the regenerated catalyst gradually increases and the catalyst becomes inactive.

Because of the superior selectivity properties of the silica-magnesia catalyst it is desirable to find a means of making it more effective in cracking reactions. We have found that when silica-magnesia catalysts are modified by the addition of phosphate and employed in cracking reactions in combination with crystalline zeolite catalysts, superior results are obtained. In brief summary, this invention comprises cracking or hydrocracking petroleum feedstocks boiling above the gasoline boiling range to produce the maximum quantity of gasoline and a minimum of light ends and coke employing a phosphate promoted silica-magnesia catalyst and a suitable molecular sieve type catalyst. Typical methods of producing the catalysts and comparative results of cracking and hydrocracking runs are set forth below in the specification.

The catalyst mixture or blend can be formulated in a number of ways as follows:

(A) For catalytic cracking—
(1) Dry mixing the prepared zeolite with the prepared phosphate promoted $SiO_2/MgO$ gel and forming into physical shapes, i.e., pills, spheres, extrudates, etc.
(2) Combining wet slurries of the zeolite and promoted $SiO_2/MgO$ gel, drying and forming into desired shapes.
(3) Dispersing the zeolite in the amorphous phosphate promoted $SiO_2/MgO$ hydrogel, spray drying to form microspheres and washing/exchanging to make the desired catalyst composition.

(B) For hydrocracking—
(1) Preparing a zeolite with a hydrogenation component distended on the surface, preparing the phosphate promoted $SiO_2/MgO$ gel, dry mixing the two components and forming into physical shapes.

(2) Dry mixing the zeolite and phosphate promoted $SiO_2/MgO$, adding a solution of the hydrogenation component to the composite, drying and forming.
(3) Same preparation as that shown in paragraph A-3, above, with added hydrogenation component.
(4) Combining wet slurries of the zeolite and phosphate promoted $SiO_2/MgO$, adding a solution of the hydrogenation component, drying and forming into suitable shapes.

In one embodiment the catalyst is steam treated at any suitable stage of the preparation sequence.

Conventional cracking and hydrocracking zeolites are employed in the catalyst mixture. Because of the ability of these zeolite materials to selectively absorb molecules on the basis of their size and shape, they have often been referred to as "molecular sieves." The various types of molecular sieves may be classified according to the size of the molecules which will be rejected (i.e. not adsorbed by a particular sieve) which of course will be directly related to the diameter of the pore openings. These zeolite materials have been extensively described in the patent literature; for example, U.S. Patents Nos, 3,013,982–86 describe a number of synthetic zeolites, and designate them as Zeolites A, D, L, R, T, X, and Y.

In general, those crystalline alumino-silicate zeolites which have been found useful in cracking and hydrocracking processes are represented by the following molar formula:

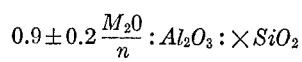

$$0.9 \pm 0.2 \frac{M_2O}{n} : Al_2O_3 : X SiO_2$$

wherein M is selected from the group consisting of metal cations and hydrogen, $n$ is its valence, and $x$ is a number from about 1.5 to about 12. They will usually have uniform pore openings of about 6 to 15, preferably about 10 Angstrom units in diameter. The processes for producing thees materials are well known in the art. They typically involve crystallization from reaction mixtures containing alumina, silica, alkali metal oxide, and water, all supplied by suitable source materials. A type of synthetic zeolite which has recently gained wide acceptance as a hydrocracking catalyst support because of its greater stability and higher activity is the synthetic faujasite variety, wherein $x$ in the above formula is about 2.5 to 7, preferably 3 to 6, most preferably 4 to 5.5. This material has a crystal structure similar to the natural mineral faujasite and can be prepared by the procedude described in U.S. Patent No. 3,130,007 which refers to its as "Zeolite Y." Other types of zeolite materials have also been found useful in cracking and hydrocracking processes. For example, synthetic mordenite has the capability of admitting aromatics into its pores, and will therefore be suitable.

For use as catalytic agents suitable in hydrocarbon conversion processes such as cracking and hydrocracking, the zeolites are usually subjected to cation exchange to reduce their alkali metal oxide content to less than about 10 wt. percent, preferably less than about 5 wt. percent. Conventionally, the alkali metal oxide content has been reduced by ion exchange treatment with solutions of ammonium salts and/or salts of metals in Groups I to VIII or the rare earth metals, preferably metal in Groups II, III, IV, V, VI–B, VII–B, VIII and the rare earth metals. Mixtures of these cations have also been employed. For cracking and hydrocracking purposes, the hydrogen and/or magnesium or rare earth forms of these zeolites have been preferred.

For hydrocracking the modified crystalline zeolite is composited with a hydrogenation component. If this is to be a platinum group metal, it may be added as a platinum or palladium salt or ammonium complex, e.g. platinous tetraaminodichlorde, ammonium chloroplatinate, palladium chloride, etc. Incorporation of the hydrogenation component may be accomplished by any conventional technique such as ion exchange followed by reduction, impregnation, etc. When palladium is employed, the exchanged alumino-silicate is preferably contacted with an ammoniacal solution of palladium chloride sufficient to produce the desired amount of hydrogenation metal in the final product, and then dried and calcined at a temperature of 800 to 1000° F. Reduction to the metal is then accomplished either separately or in the hydrocracking reaction, per se. The amount of hydrogenation component may range from about 0.1 to about 25 wt. percent based on the weight of the final catalyst or catalyst mixture when both the zeolite and the phosphate containing $SiO_2/MgO$ catalysts contain hydrogenation components. In the case of platinum group metals, e.g. palladium, the preferred amount will be in the range of about 0.1 to 2 wt. percent based on the dry catalyst or catalyst mixture. While platinum group metals are the preferred hydrogenation components, other metals of Group VIII or combinations of metals of Groups VI–B and VIII of the Periodic Table can be used. For example a combination of nickel and tungsten can be employed. The most preferred forms of the faujasite component of the composite catalyst catalysts are Pd-H-Faujasite and Ni-W-H-Faujasite containing 1–8 wt. percent Ni and 3–17 wt. percent W.

For catalytic cracking, the combined catalyst will contain a minor proportion of zeolite catalyst and a major proportion of phosphate promoted silica-magnesia catalyst, i.e., 1–45 wt. percent, preferably 5–20 wt. percent zeolite catalyst and the balance promoted $SiO_2/MgO$. For hydrocracking, the combined catalyst will contain less phosphate promoted silica-magnesia catalyst and more zeolite catalyst, i.e. 5–50 wt. percent preferably 15–40 percent promoted $SiO_2/MgO$ and the balance zeolite.

The phosphate promoted silica-magnesia catalyst can be made in any suitable manner. Generally speaking a phosphate and a magnesium salt are blended with a silica hydrosol or hydrogel. The zeolite with or without a hydrogenation promoter is added at the desired stage of catalyst preparation.

Although the exact role played by the phosphate in the catalysts of our invention is not known precisely it is believed that it functions in several ways. The following explanation is not intended to impose any limitations on the scope of our invention. In the final washing/exchange steps involved in making a conventional silica-magnesia catalyst the magnesium is labile and is partially washed out of the system. The extent of this loss is variable so that a non-uniform catalyst composition and non-uniform catalyst performance results. Addition of the phosphate to the silica-magnesia composite apparently ties up the magnesium so that it is not lost to the system during the final washing and drying steps. Another possible role played by the phosphate is to provide additional acidity to the catalyst. It is well recognized that mixed oxide type catalysts such as silica magnesia, silica-alumina, and the like are characterized by a measureable acidity. This acidity is believed necessary for the catalytic reactions that are promoted. Addition of phosphate enhances the acidic nature of the final catalyst.

Phosphate may be added to the catalyst as either phosphoric acid or as a partially neutralized (preferably with ammonia) acid with the system in the pH range of about 3.5 to 7.5. This will maximize the retention of the magnesium. When crystalline zeolites are already in the composite it is essential that the pH of the system be greater than 3.5 as lower pH media (more acidic) may destroy the crystallinity.

The following examples show the source of the method of preparation of the catalysts employed in the catalytic cracking runs summarized below in Table I.

EXAMPLE 1

Preparation of Catalyst A

The catalyst of this example was a silica-alumina catalyst widely used in commercial fluid catalytic cracking operations. The catalyst was manufactured by the Davison Chemical Company and consisted of about 25% alumina and 75% silica.

EXAMPLE 2

Preparation of Catalyst B

A dilute sodium silicate solution was contacted with $CO_2$ to lower the pH to about 10 and effect gelation. After a suitable aging period, the silica hydrogel was contacted with aluminum sulfate solution, and the pH of the mixture adjusted to around 6.0. In a separate vessel, a slurry of sodium faujasite (Y-type) was made comprising 15 wt. percent solids. The faujasite slurry was admixed with the silica/alumina slurry in an amount to give about 5 wt. percent faujasite in the final catalyst. The mixture was spray dried, washed and exchanged with $(NH_4)_2SO_4$ solution, reslurried in $MgSO_4$ solution, filtered and water washed to remove residual soluble salts and then dried. The catalyst is a catalyst of commerce and comprises 0.25% $Na_2O$, 0.3–0.8% MgO and the remainder silica/alumina.

EXAMPLE 3

Preparation of Catalyst C

Three (3) kilograms cracked ice were placed in a plastic bucket and 1180 grams $H_2SO_4$ (96%) added. In a separate plastic bucket were placed 4250 grams of N-brand sodium silicate ($Na_2O \cdot 3.25\ SiO_2$) solution of 1.21 sp. gr. With rapid stirring, the silicate solution was poured into the ice cold $H_2SO_4$, stirred for several minutes and then left to gel. A hard gel formed overnight which was then broken up into granules and washed with water until only a trace of sulfate remained. The total weight of the silica hydrogel was 6748 grams and comprised 11.3 wt. percent $SiO_2$.

2250 gr. of the silica hydrogel (254 g. $SiO_2$) were placed in a ball mill with 135 g. of MgO powder, and 450 cc. $H_2O$. The mixture was ball milled 2 hours. The slurry was suction filtered, rinsed with 500 cc. but 9% $MgSO_4$ solution, then rinsed with 250 cc. $H_2O$. The filter cake was reslurried in 1500 cc. of a solution containing 51 grams $H_3PO_4$ and 50 cc. $NH_4OH$ (28% $NH_3$). This corresponds (empirically) to about $(NH_4)_{1.5}H_{1.5}PO_4$. The reslurry step continued for 10 minutes. The material then was suction filtered, oven dried, and ground into coarse granules. The catalyst analyzed 7.1 wt. percent $P_2O_5$, 32.1 wt. percent MgO, and 60.5 wt. percent $SiO_2$.

EXAMPLE 4

Preparation of Catalyst D

In a ball mill jar were placed 2250 grams of washed $SiO_2$ hydrogel, 135 grams MgO powder and 450 cc. $H_2O$. The mixture was balled milled 2 hours. The slurry was suction filtered, rinsed with 500 cc. hot 9% $MgSO_4$ solution and then with 250 cc. cold $H_2O$. The filter cake was then reslurried in 1500 cc. of a solution comprising 51 grams $H_3PO_4$ and 50 cc. $NH_4OH$ (28% $NH_3$) for 10 minutes and suction filtered. The filter cake was blended with 250 cc. $H_2O$ and colloid milled. In a separate vessel 27.5 g. $NH_4$-faujasite (21.5 g. dry basis) were slurried in 200 cc. $H_2O$ and colloid milled. The two colloid milled slurries were mixed and colloid milled together, oven dried, and then ground into coarse granules. Analysis of the material showed 7.3 wt. percent $P_2O_5$ and 30.8 wt. percent MgO. This catalyst comprised 5% H-faujasite in the matrix.

EXAMPLE 5

Preparation of Catalyst E

In a ball mill jar were placed 2250 grams washed $SiO_2$ hydrogel, 135 grams MgO powder, and 450 cc. $H_2O$. The contents were ball milled for 90 minutes. The jar was opened and 26 grams oven dried $NH_4$-faujasite (20.3 g. dry basis) added. The mixture was ball milled an additional 30 minutes and then oven dried and coarse ground. Analysis showed 34.0 wt. percent MgO. The composite catalyst comprised 5% faujasite in the matrix.

EXAMPLE 6

Catalyst A–E were each pilled and calcined by heating for 16 hours at 1000° F. followed by steaming for 16 hours at 1200° F. at 0 p.s.i. Each catalyst was tested for cracking performance in a batch fluid operation at 950° F. using a 500–700° F. boiling range light virgin gas oil and a 2-minute process period. In the following table catalyst performances are compared at a constant of 60 wt. percent conversion to 430° F.-material.

TABLE I

| Catalyst | A | B | C | D | E |
|---|---|---|---|---|---|
| Conv., Wt. Percent | 60 | 60 | 60 | 60 | 60 |
| Carbon, Wt. Percent | 5 | 1.5 | 1.5 | 0.9 | 1.7 |
| $C_3-$ Gas, Wt. Percent | 12 | 7.5 | 5.5 | 5 | 5 |
| Total $C_4$, Wt. Percent | 14 | 11 | 8 | 8 | 9 |
| $C_5$/430° F., Wt. Percent | 29 | 40 | 45 | 46 | 44 |

The comparative data emphasize the superior performance of the cracking catalysts employed in the process of the invention. Catalyst A, the conventional silica alumina cracking catalyst, shows conversion of the gas oil to more coke and gas and less gasoline than any of the others. When zeolite is added to silica alumina catalyst (Catalyst B) performance improves. A phosphate promoted silica-magnesia catalyst (Catalyst C) also gives good results. However, the cracking catalyst (Catalyst C) also gives good results. However, the cracking catalyst which gives the best results is the catalyst employed in the process of the invention—Catalyst D. Cracking runs with this catalyst yield 46 wt. percent $C_5$/430° F. gasoline, 8 wt. percent total $S_4$ and only 5 wt. percent light ends. The quantity of carbon—0.9 wt. percent is less than that of any other catalyst shown in Table I.

The following examples show the source or method of preparation and test results employing the catalysts of the invention in hydrocracking reactions.

EXAMPLE 7

Preparation of Catalyst F

The catalyst of this example is a commercially available hydrocracking catalyst and is made in the following general manner. Sodium faujasite (Y-type) is base exchanged with $NH_4+$ to a residual $Na_2O$ content of 2.0 wt. percent and then partially exchanged with $Mg++$ to introduce about 2.5 wt. percent MgO into the faujasite composition. After washing and drying, the material is contacted with a solution of tetra-amine palladium dichloride sufficient to incorporate about 0.6% Pd into the material. In a separate vessel a pure, porous alumina carrier is composited with about 0.3% Pd by impregnation. Then 4 parts by weight of the stabilized faujasite material are blended with 1 part by weight of the alumina and shaped into 1/8" x 1/8" cylindrical pellets. The overall composite catalyst comprises about 0.54 wt. percent Pd, about 80% faujasite, and about 20% $Al_2O_3$.

EXAMPLE 8

Preparation of Catalyst G

The catalyst of this example is a catalyst of the invention. Na-faujasite (Y-type) was base exchanged with $NH_4+$ until the residual $Na_2O$ content was 2.0 wt. percent and the material oven dried. 308 grams of the oven dried material (240 grams dry basis) were placed in a dish and 275 cc. $H_2O$ added to make a slurry. With stirring, 40 cc. of a solution of $Pd(NH_3)_4Cl_2$ (equivalent to 1.44 g. Pd°) were added dropwise. The slurry was warmed to around 160° F. and kept there for three hours before oven drying.

Separately, a portion of catalyst C was calcined at 1000° F. for 16 hours. Then, 18.7 grams of calcined C were dry mixed with 95 grams of the oven dried (74.8 g. dry basis) faujasite containing 0.6% Pd. The composite catalyst had a nominal composition of 0.48% Pd, 80% H-form faujasite (after calcination), and 20% phosphate promoted $SiO_2$/MgO. After blending the dry components the catalyst was pelleted.

EXAMPLE 9

Pelleted Catalysts "F" and "G" were each cracked and sized to make 14–65 mesh granules and tested for hydrocracking performance. The catalysts were calcined overnight at 1000° F. in dry air, cooled, transferred to the hydrocracking reactors, and reduced with hydrogen at 700° F. while bringing up to 1500 p.s.i.g. pressure. The feedstock used was a hydrofined light cycle oil which was spiked with 3000 p.p.m. sulfur as thiophene and 1000 p.p.m. nitrogen as n-butyl amine. With catalyst F as reference catalyst (activity=100), catalyst G of our invention showed 114% relative activity after 95 hours and 138% activity after 167 hours of operation with the oil feed. These data attest to the high activity and projected long life of catalyst G, the hydrocracking catalyst of our invention.

The cracking and hydrocracking reactions of the invention are carried out in conventional fixed bed, moving bed or fluidized bed units. Suitable cracking feeds include petroleum fractions boiling in the range of from about 300–1100° F. Cracking feeds generally boil in the range of 450–1100° F. and include light and heavy virgin gas oils, coker distillates, light and heavy catalytic cycle oils, thermally cracked fractions and mixtures thereof. Suitable cracking conditions are set forth in Table II which follows.

TABLE II.—CATALYTIC CRACKING CONDITIONS

| | Broad Range | Preferred Rang |
|---|---|---|
| Temperature, ° F | 500–1,200 | 750–1,000 |
| Pressure, p.s.i.g | 0–500 | 0–50 |
| LHSV, v./v./hr | 0.2–20 | 3–15 |

Hydrocracking feeds boil in the range of 300–1100° F., preferably 300–900° F., and include light and heavy naphtha, kerosene, and other distillate fractions. Suitable hydrocracking conditions are set forth below in Table III.

TABLE III.—HYDROCRACKING CONDITIONS

| | Broad Range | Preferred Range |
|---|---|---|
| Temperature, ° F | 450–1,000 | 450–750 |
| Pressure, p.s.i.g | 200–3,000 | 1,000–2,000 |
| LHSV, v./v./hr | 0.1–10 | 0.5–3 |
| $H_2$/Oil Ratio, s.c.f./b | 1,000–25,000 | 2,000–12,000 |

The process of the invention provides an improved means of utilizing magnesia-containing catalysts in catalytic cracking and hydrocracking operations wherein the superior selectivity of this type of catalyst is maintained over long periods without deactivation.

After deactivation by coke laydown on the catalyst has become such that conversion is reduced, the catalyst is regenerated in the conventional manner.

What is claimed is:

1. A process for cracking a petroleum feedstock to produce lower boiling petroleum fractions which comprises subjecting said feedstock to cracking temperatures and pressures in the presence of a crystalline zeolite catalyst combined with a phosphate-promoted silica-magnesia catalyst and recovering the cracked fractions.

2. Process according to claim 1 in which said feedstock is a gas oil fraction boiling in the range of 450 to 1100° F.

3. Process according to claim 1 in which the catalyst is prepared by the steps of (A) dispersing the crystalline zeolite in the amorphous phosphate-promoted $SiO_2/MgO$ compound, (B) spray drying to form microspheres, (C) washing/exchanging, and (D) recovering the finished catalyst composition.

4. Process according to claim 1 in which the zeolite is synthetic faujasite.

5. Process according to claim 1 in which the catalyst contains a major proportion of phosphate-promoted silicamagnesia component and a minor proportion of zeolite component.

6. Process for hydrocracking a petroleum feedstock to produce a maximum amount of gasoline which comprises subjecting said feedstock to hydrocracking temperatures and pressures in the presence of hydrogen and a hydrocracking catalyst comprising a hydrogenation component distended on a crystalline zeolite catalyst combined with a phosphate promoted silicamagnesia catalyst and recovering the hydrocracked products.

7. Process according to claim 6 in which said feedstock is a distillate fraction boiling in the range of 300 to 900° F.

8. Process according to claim 6 in which the catalyst is prepared by the steps of (A) combining wet slurries comprising a major amount of the crystalline zeolite and a minor amount of the phosphate-promoted $SiO_2/MgO$ compund, (B) adding a solution of the hydrogenation component, (C) drying, and (D) forming into suitable shapes.

9. Process according to claim 6 in which the hydrogenation component is a platinum group metal.

10. Process according to claim 6 in which the zeolite catalyst component is Ni-W-faujasite.

References Cited

UNITED STATES PATENTS

| | | | |
|---|---|---|---|
| 3,140,253 | 7/1964 | Plank et al. | 208—120 |
| 3,386,801 | 6/1968 | Kuehl | 23—105 |

DELBERT E. GANTZ, Primary Examiner

ABRAHAM RIMENS, Assistant Examiner

U.S. Cl. X.R.
208—120; 252—455